(12) United States Patent
Qiu et al.

(10) Patent No.: US 8,386,590 B2
(45) Date of Patent: Feb. 26, 2013

(54) METHOD AND APPARATUS FOR MANAGING REHOMING OF USER ENDPOINT DEVICES IN A COMMUNICATION NETWORK

(75) Inventors: Chaoxin Qiu, Austin, TX (US); James Jackson, Austin, TX (US); Mehrad Yasrebi, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 714 days.

(21) Appl. No.: 12/571,755

(22) Filed: Oct. 1, 2009

(65) Prior Publication Data

US 2011/0082919 A1   Apr. 7, 2011

(51) Int. Cl.
*G06F 15/16* (2006.01)
(52) U.S. Cl. .................................. 709/221; 709/245
(58) Field of Classification Search .................. 709/221, 709/245
See application file for complete search history.

(56) References Cited

U.S. PATENT DOCUMENTS

| | | | |
|---|---|---|---|
| 7,894,410 B2 * | 2/2011 | Zhou et al. | 370/338 |
| 2004/0152469 A1 * | 8/2004 | Yla-Outinen et al. | 455/453 |
| 2008/0144605 A1 * | 6/2008 | Qiu et al. | 370/352 |
| 2008/0247526 A1 * | 10/2008 | Qiu et al. | 379/142.06 |
| 2009/0141878 A1 * | 6/2009 | Ballard et al. | 379/142.1 |
| 2010/0332915 A1 * | 12/2010 | Qiu et al. | 714/49 |
| 2011/0078229 A1 * | 3/2011 | Qiu et al. | 709/203 |
| 2011/0096788 A1 * | 4/2011 | Ballard et al. | 370/401 |
| 2012/0140774 A1 * | 6/2012 | Oster et al. | 370/401 |
| 2012/0143982 A1 * | 6/2012 | Oster et al. | 709/217 |

* cited by examiner

*Primary Examiner* — Douglas Blair
(74) *Attorney, Agent, or Firm* — Guntin & Gust, PLC; Ed Guntin

(57) ABSTRACT

A system that incorporates teachings of the present disclosure may include, for example, a Domain Name System (DNS) server having a controller to receive new provisioning information for updating a Fully Qualified Domain Name (FQDN), and update the FQDN with the new provisioning information. The new provisioning information can include among other things a start time for rehoming one or more user endpoint devices (UEs) assigned to a current session border Controller (S/BC), a move-from record comprising a descriptor of at least the current S/BC, a move-to record comprising a descriptor of at least a new S/BC to which to rehome the one or more UEs, a transfer window representing a total time for the rehoming the one or more UEs to the new S/BC, and a pacing parameter for rehoming the one or more UEs to the new S/BC during the transfer window. Additional embodiments are disclosed.

20 Claims, 13 Drawing Sheets

Illustrative DNS SRV Assignments

West Region

; SRV records for subscribers designated to Dallas Server Office
; Assign higher priority 0 and larger weight 3 to the S/BC in Dallas SO
 _sip._udp.sbcwest.att.net    SRV    0    3    5060    ims-core1.att.net
                              SRV    1    0    5060    ims-core2.att.net ims-core1    A    142.30.79.10
ims-core2    A    142.30.89.10

East Region

; SRV records for subscribers designated to Philadelphia Server Office
; Assign higher priority 0 and larger weight 3 to the S/BC in Philadelphia SO
 _sip._udp.sbceast.att.net    SRV    0    3    5060    ims-core2.att.net
                              SRV    1    0    5060    ims-core1.att.net ims-core1    A    142.30.79.10
ims-core2    A    142.30.89.10

Illustrative Directory of LATA-based Virtual FQDN Assignment

| LATA ID | Virtual FQDN Assigned | Number of Subscribers Assigned | Maximal Number of Subscribers |
|---|---|---|---|
| 320 | _sip._udp.lata320AA.ims.uverse.att.net | 1900 | 2000 |
| 320 | _sip._udp.lata320AB.ims.uverse.att.net | 1800 | 2000 |
| 320 | _sip._udp.lata320AC.ims.uverse.att.net | 1750 | 2000 |
| 320 | _sip._udp.lata320AD.ims.uverse.att.net | 1950 | 2000 |
| 320 | _sip._udp.lata320AE.ims.uverse.att.net | 851 | 2000 |
| 358 | _sip._udp.lata358AA.ims.uverse.att.net | 1788 | 2000 |
| 358 | _sip._udp.lata358AB.ims.uverse.att.net | 1850 | 2000 |
| 358 | _sip._udp.lata358AC.ims.uverse.att.net | 1800 | 2000 |
| 358 | _sip._udp.lata358AD.ims.uverse.att.net | 1850 | 2000 |
| 358 | _sip._udp.lata358AE.ims.uverse.att.net | 1100 | 2000 |
| 558 | _sip._udp.lata558AA.ims.uverse.att.net | 1650 | 2000 |
| 558 | _sip._udp.lata558AB.ims.uverse.att.net | 1700 | 2000 |
| 558 | _sip._udp.lata558AC.ims.uverse.att.net | 1400 | 2000 |
| 730 | _sip._udp.lata730AA.ims.uverse.att.net | 1800 | 2000 |
| 730 | _sip._udp.lata730AB.ims.uverse.att.net | 1750 | 2000 |
| 730 | _sip._udp.lata730AC.ims.uverse.att.net | 1900 | 2000 |
| 730 | _sip._udp.lata730AD.ims.uverse.att.net | 700 | 2000 |

Illustrative Directory of Virtual FQDN To SRV Record Assignment

| Virtual FQDN Assigned | Primary SRV | Secondary SRV |
|---|---|---|
| _sip._udp.lata320AA.ims.uverse.att.net | priority = 10<br>weight = 5<br>port = 5060<br>svr hostname = ph1pa01sda01ge0v1.ims.uverse.att.net | priority = 20<br>weight = 5<br>port = 5060<br>svr hostname = rd1tx01sda01ge0v1.ims.uverse.att.net |
| _sip._udp.lata358AA.ims.uverse.att.net | priority = 10<br>weight = 5<br>port = 5060<br>svr hostname = ph1pa01sda03ge0v1.ims.uverse.att.net | priority = 20<br>weight = 5<br>port = 5060<br>svr hostname = rd1tx01sda03ge0v1.ims.uverse.att.net |
| _sip._udp.lata558AA.ims.uverse.att.net | priority = 10<br>weight = 5<br>port = 5060<br>svr hostname = ch1il01sda01ge0v1.ims.uverse.att.net | priority = 20<br>weight = 5<br>port = 5060<br>svr hostname = ph1pa01sda01ge0v1.ims.uverse.att.net |
| _sip._udp.lata730AC.ims.uverse.att.net | priority = 10<br>weight = 5<br>port = 5060<br>svr hostname = sd1ca01sda01ge0v1.ims.uverse.att.net | priority = 20<br>weight = 5<br>port = 5060<br>svr hostname = rd1tx01sda01ge0v1.ims.uverse.att.net |

Illustrative Directory of S/BC's FQDN and IP Address Assignment

| Access Offices | S/BC FQDN | IP Address |
|---|---|---|
| Chicago | ch1il01sda01ge0v1.ims.uverse.att.net | 142.80.79.10 |
| San Diego | sd1ca01sda01ge0v1.ims.uverse.att.net | 142.90.79.10 |
| Philly | ph1pa01sda01ge0v1.ims.uverse.att.net | 142.60.79.10 |
| Philly | ph1pa01sda03ge0v1.ims.uverse.att.net | 142.60.79.20 |
| Richardson | rd1tx01sda01ge0v1.ims.uverse.att.net | 142.30.79.10 |
| Richardson | rd1tx01sda03ge0v1.ims.uverse.att.net | 142.30.79.20 |

Illustration for Rehoming UEs

Service provider enters the following information in the OSS to the rehome UEs:

1) The start time of the rehome operation: 06:00:00 GMT, Oct. 1, 2009
2) The SRV records for the move-from S/BC;

sip._udp.lata358AA.ims.uverse.att.net

| priority = 10 | weight = 5 | port = 5060 | svr hostname = *ch1il01sda01ge0v1.ims.uverse.att.net* |
| priority = 20 | weight = 5 | port = 5060 | svr hostname = *rd1tx01sda01ge0v1.ims.uverse.att.net* |

3) The SRV records for the move-to S/BC sip._udp.lata358AA.ims.uverse.att.net

| priority = 10 | weight = 5 | port = 5060 | svr hostname = *ch1il01sda01ge0v1.ims.uverse.att.net* |
| priority = 20 | weight = 5 | port = 5060 | svr hostname = *rd1tx01sda01ge0v1.ims.uverse.att.net* |

4) The TTL window for DNS records = 7200 seconds
5) A transfer window = 7200 seconds
6) The maximal allowable pace of initial registration requests to the move-to S/BC = 100 UEs per second

METHOD AND APPARATUS FOR MANAGING REHOMING OF USER ENDPOINT DEVICES IN A COMMUNICATION NETWORK

FIELD OF THE DISCLOSURE

The present disclosure relates generally to user endpoint device management, and more specifically to a method and apparatus for managing rehoming of user endpoint devices in a communication network.

BACKGROUND

When a service provider of communications deploys a communications network, there can be many challenges. Among them include without limitation the cost of deployment, the cost of adding network equipment to accommodate subscriber growth, maintenance of the network, serviceability of the network, and managing the addition of new subscribers to the network—just to mention a few.

BRIEF DESCRIPTION OF THE DRAWINGS

FIG. 3 depicts an illustrative embodiment of provisioning information used by a subscriber device of the communication system of FIGS. 1-2;

FIGS. 8-12 depict illustrative embodiments of the methods of FIGS. 6-7; and

DETAILED DESCRIPTION

One embodiment of the present disclosure entails a Domain Name System (DNS) server having a controller to receive new provisioning information for updating a Fully Qualified Domain Name (FQDN), and update the FQDN with the new provisioning information. The new provisioning information can include among other things a start time for rehoming one or more user endpoint devices (UEs) assigned to a current session border Controller (S/BC), a move-from record comprising a descriptor of at least the current S/BC, a move-to record comprising a descriptor of at least a new S/BC to which to rehome the one or more UEs, a transfer window representing a period of time where the rehoming of UEs are subject to a pacing parameter, and a pacing parameter for rehoming the one or more UEs to the new S/BC during the transfer window. Some UEs may be transferred outside of the transfer window, where the transfer rate is not subject to the pacing parameter.

One embodiment of the present disclosure entails a computing device having a controller to receive new provisioning information to rehome one or more UEs, direct DNS server to update an FQDN associated with the one or more UEs to be rehomed with the new provisioning information. The new provisioning information can include the start time for rehoming the one or more UEs from the current session S/BC to the new S/BC, and the pacing parameter for rehoming the one or more UEs to the new S/BC.

One embodiment of the present disclosure entails a method to receive at DNS new provisioning information for updating an FQDN, and update at the DNS the FQDN with the new provisioning information. The new provisioning information can include the start time for rehoming one or more UEs from the current S/BC to the new S/BC, and a parameter to pace registrations of the one or more UEs to the new S/BC.

Figure 1:
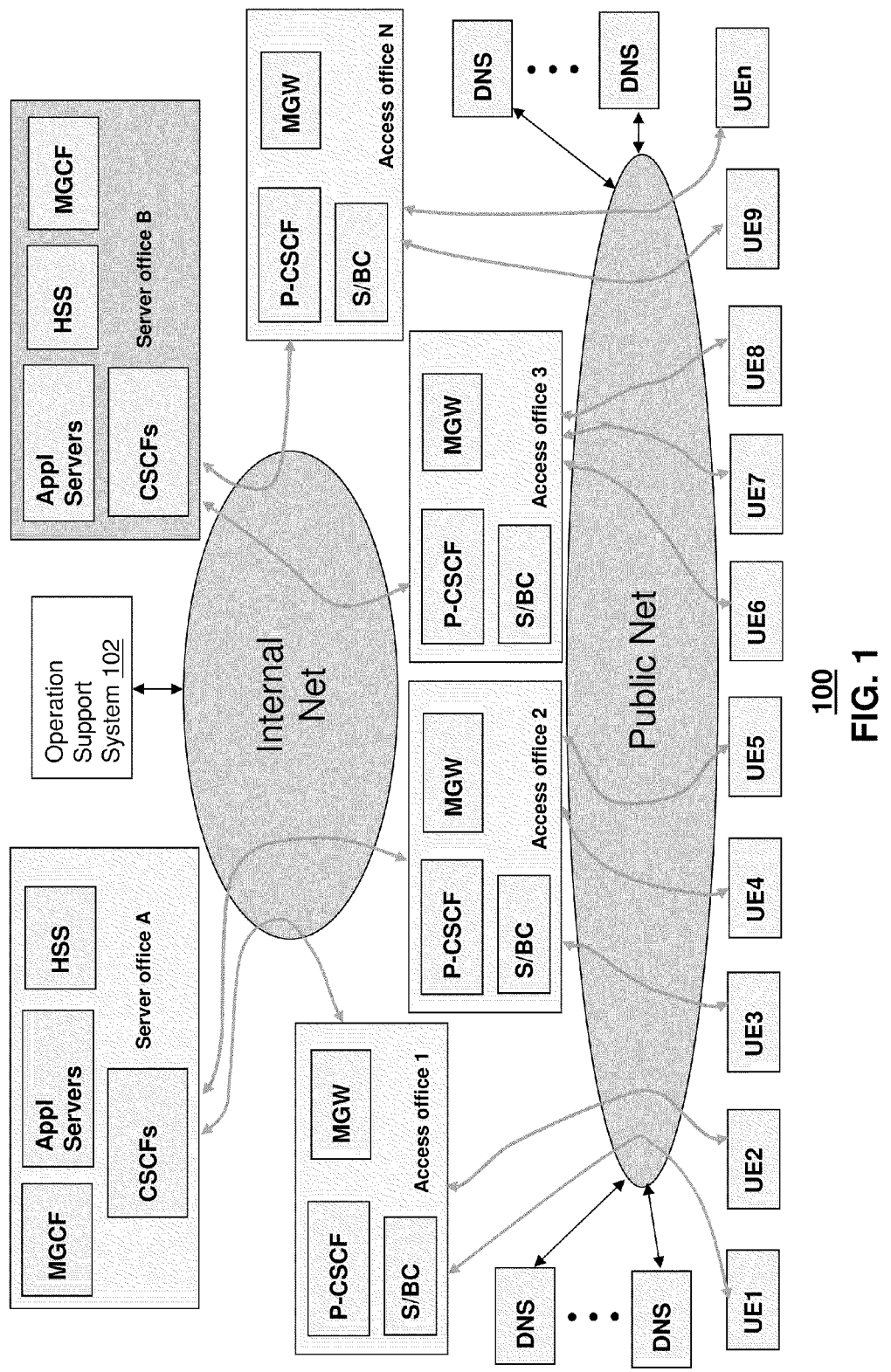
FIGS. 1-2 depict illustrative embodiments of a communication system.
Figure 2:
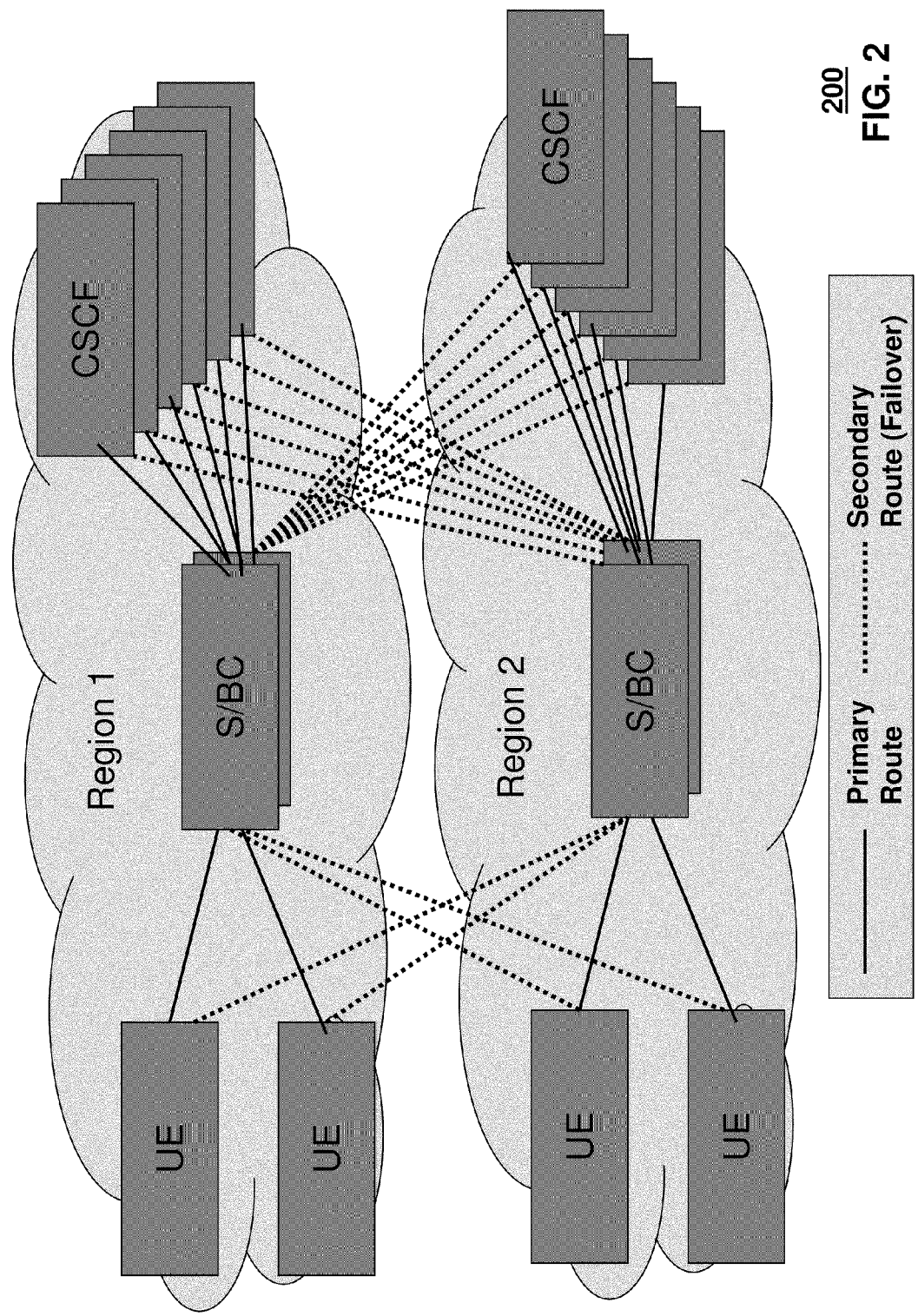

FIGS. 1-2 depict illustrative embodiments of a communication system. FIG. 1 depicts a Next Generation Network (NGN) comprising network elements that among other things can provide subscriber services such as Voice over Internet Protocol (VoIP), traditional Public Network Switched Network (PSTN), and a hybrid communications between VoIP and PSTN communication devices. NGN networks can have Access Offices which can communicate with subscriber devices in the form of user endpoint (UE) communication devices (herein referred to as UEs) over a Public Network of a service provider. The Public Network can be third party ISPs that provide Internet access to UEs in the last mile. The Access Offices can include among other things a Session Border Controller (S/BC) for interfacing with the UEs and thereby providing communication services thereto by way of a Proxy Call Session Control Function (P-CSCF) which communicates with a Server Office over an Internal Network of the service provider such as a Multi-Protocol Label Switching (MPLS) network. The Media Gateway (MGW) can be used to support hybrid communications between the UEs such as VoIP audio packets and PSTN TDM-based voice trunks.

The S/BC can submit communication requests initiated by the UEs to the Server Office via a P-CSCF. The Server Office in turn can manage such requests utilizing combinations of CSCFs, Application Servers, a Media Gateway Control Function (MGCF) which supports PSTN communications, and a Home Subscriber Server (HSS). The network elements of the Server Office singly or in combination provide resources to establish communications between UEs of a VoIP or PSTN type. The service provider of the communication network of FIG. 1 can provision the UEs by way of Domain Name Systems (DNS) servers which can be programmed by the service provider as desired.

The UEs are provisioned by the service provider with necessary information to connect to the NGN communication network of FIG. 1 and to obtain services therefrom. The UEs can request additional contact information of the service provider network from DNS servers on a periodic basis. The information can include information associated with a primary or secondary S/BC of one or more Access Offices. As will be shown, the UE preferably registers with an Access Office with the primary S/BC. As shown in FIG. 2, the UE can register with the secondary S/BC as a means to mitigate a communication fault experienced by a network element of an Access Office or a Server Office which causes interruption in communication services provided to the UE.

FIG. 3 depicts an illustrative embodiment of provisioning information in the form of DNS Serve (SRV) records conforming to standards promulgated by the Internet Engineering Task Force (IETF). FIG. 3 illustrates a first logical Fully Qualified Domain Name (FQDN) associated with a West Region of the United States configured in such a manner that UEs in the West Region are primarily served by a Server Office located in Dallas. FIG. 3 further illustrates a second logical FQDN associated with an East Region of the United States configured in such a manner that UEs in the East Region are primarily served by a Server Office located in Philadelphia. Each logical FQDN can comprise primary and secondary SRV records for directing UEs to a primary or secondary S/BC, respectively, operating in a corresponding Access Office. For illustration purposes only, the first logical FQDN is represented by the character string_sip._udp.sbcwest.att.net, while the second logical FQDN is represented by the character string_sip._udp.sbceast.att.net. Any desirable character arrangement is possible for defining an FQDN.

A UE can be provisioned for example with a logical FQDN such as _sip._udp.sbcwest.att.net (or the other) shown in FIG. 3 by common means (e.g., at point of sale, over-the-air programming for wireless communication devices such as cellular phones, or by way of wireline provisioning). Once it is provisioned, a UE can query a DNS server for the SRV records associated with its logical FQDN according to the flow diagram of FIG. 4. As shown in the flow diagram, the DNS server can supply SRV records responsive to a query with the logical FQDN _sip._udp.sbcwest.att.net.

The priority of the first SRV record, designated by the field with the number "0", supersedes the priority of the second SRV record designated by the field with the number "1". Accordingly the A-record ims-core1.att.net supplied by the DNS server for the first SRV record corresponds to the primary S/BC, while the A-record ims-core2.att.net supplied by the DNS server for the second SRV record corresponds to the secondary S/BC. It should be noted that the primary and secondary S/BC's is determined by the priority field of the SRV records not the order of the SRV records shown in FIG. 3.

Figure 4:
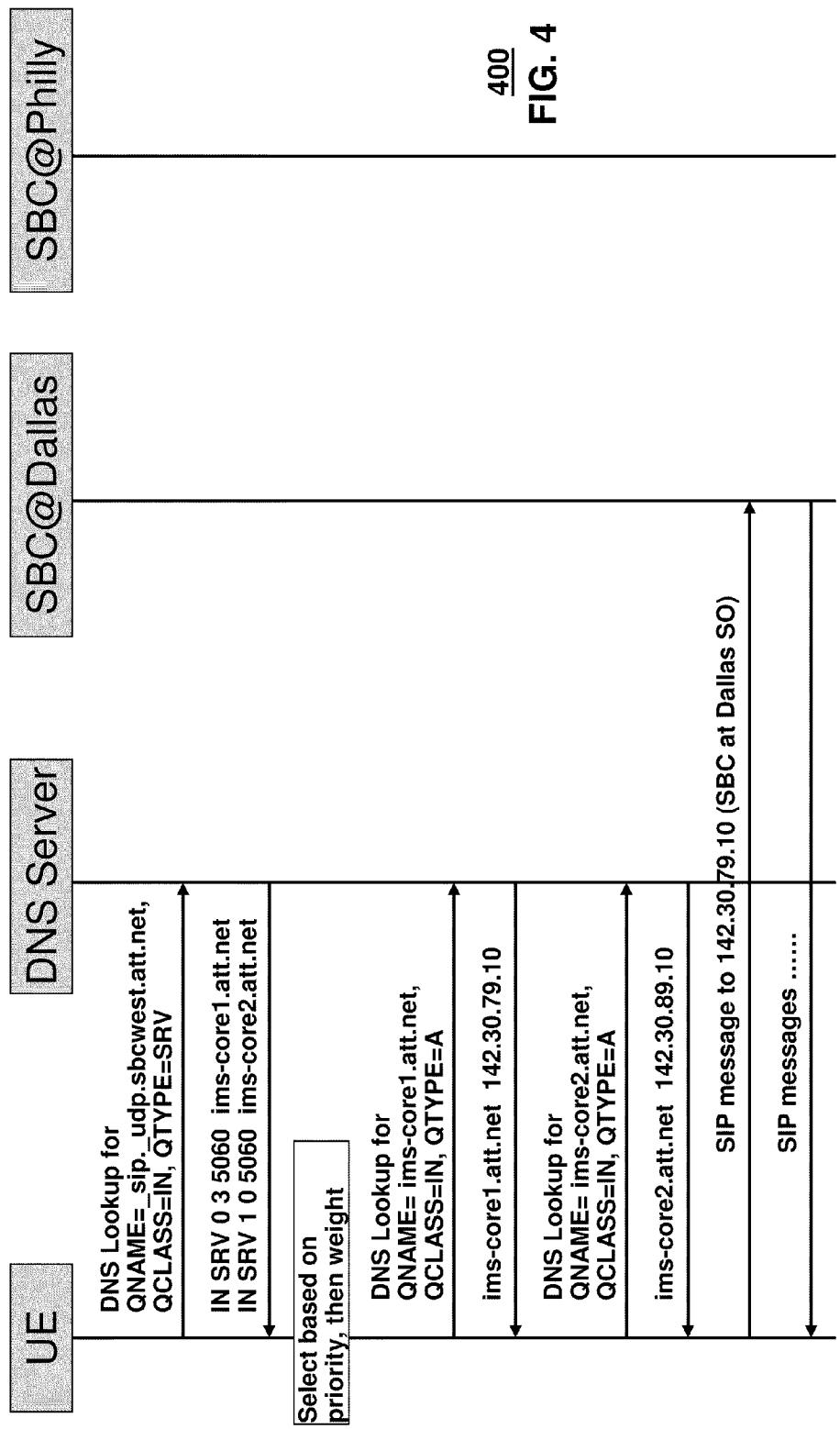
FIGS. 4-5 depict illustrative embodiments of communication flow diagrams between the subscriber device and network elements of the communication system.

With the primary and secondary A-records, a UE assigned to the West Region FQDN (_sip._udp.sbcwest.att.net) can proceed to request the IP address of the primary S/BC (142.30.79.10) followed by the IP address of the secondary S/BC (142.30.89.10). Since the primary SRV record has a higher priority than the secondary SRV record, the UE chooses to register with the primary S/BC as shown in the illustration of FIG. 4, which in this example is situated in Dallas. If the UE is unable to register with the primary S/BC, it reverts to the secondary S/BC as depicted in the call flow diagram of FIG. 5.

It should be noted that the logical FQDN can be associated with any S/BC of any Access Office. Referring back to FIG. 3, the logical FQDN of the East Region (_sip._udp.sbceast.att.net) is programmed with a reverse order of the primary and secondary SRV records of the FQDN (_sip._udp.sbcwest.att.net) of the West Region. Thus a UE provisioned with the logical FQDN of the East Region shown in FIG. 3 will register with the primary S/BC situated in Philadelphia, and will rely on the secondary S/BC situated in Dallas for backup services. As such, UEs in the East region, provisioned with _sip._udp.sbceast.att.net, will use ims-core2.att.net since it has the priority 0, which is the higher priority.) The ability to associate the logical FQDN with any S/BC of any region or Access Office provides a service provider a means to manage the distribution and reallocation of UEs in an NGN network.

Figure 6:
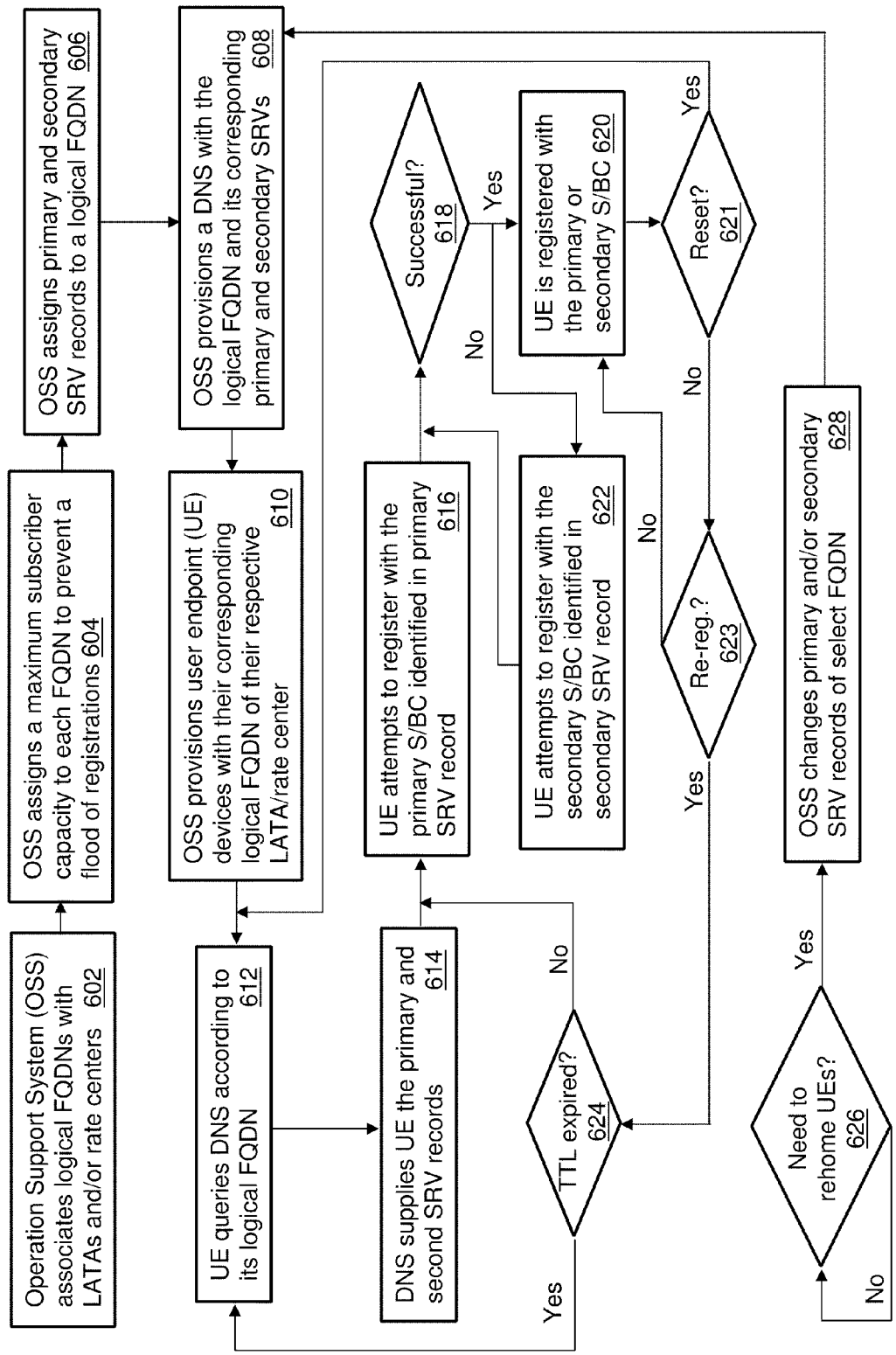
FIGS. 6-7 depict illustrative methods operating in portions of the communication system of FIGS. 1-2.

Method 600 of FIG. 6 depicts an illustrative embodiment for managing UEs in an NGN network. Method 600 can be implemented in part with an Operation Support System (OSS) 102 such as shown in FIG. 1. The OSS 102 can represent one or more computing systems such as servers, mainframes, or other suitable computing resources. Although the OSS 102 is illustrated as a centralized system coupled to the Server and Access Offices by way of the internal network, the OSS 102 can alternatively be a distributed system with computing components located anywhere in the NGN network of FIG. 1.

With this in mind, method 600 can begin with step 602 where the OSS 102 is programmed to associate logical FQDNs with Local Access Transport Areas (LATAs) and/or rate centers. LATA is a term used in telecommunications which can represent geographic areas within which the divested Regional Bell operating Companies (RBOCs) are permitted to offer exchange telecommunication services. LATAs can be subdivided into rate centers in the form of Number Plan Areas (NPAs or area codes) and three digit entity codes commonly referred to as NXX. Logical FQDNs can instead be associated with just rate centers. From these illustrative embodiments, it should be evident that any suitable geographical designation can be associated with logical FQDNs. Thus, the present disclosure contemplates logical FQDNs associated with LATAs, rate centers, other geographic designations, or combinations thereof. For illustration purposes only, however, the present disclosure describes LATA-based FQDNs from this point forward.

FIG. 8 depicts an illustration of logical FQDNs having LATA associations. The LATA-based FQDNs and subdivisions thereof can be stored by the OSS 102 as a directory in a common database system. The OSS 102 can be programmed to record in the database and thereby track the number of UE devices assigned to each logical FQDN. It should be noted that not all logical FQDNs need to be in use. Some logical FQDNs may in fact have no UEs assigned to them yet, and only until such time there is a subscriber need would such FQDNs be used.

In step 604 the OSS can assign each logical FQDN a maximum subscriber capacity to prevent a flood of registrations by UEs during operations. In the same database or another database, the OSS 102 can be programmed in step 606 to record a directory of assignments of primary and secondary SRV records to each logical FQDN as shown in FIG. 9. The IP addresses assigned to the primary and secondary records can be stored in the same directory of SRV records or in yet another database. The IP addresses represent the contact interfaces of S/BCs deployed in various Access Offices as shown in FIG. 10. As the NGN network expands and new Access Offices are installed, more S/BCs can be deployed with their IP addresses assigned. Once the logical FQDN have been assigned with primary and secondary SRV records as shown in FIGS. 8-10, the OSS 102 can be directed to provision in step 608 one or more DNS servers such as shown in FIG. 1 with the FQDNs and their corresponding SRV record assignments.

Upon making the FQDNs and their corresponding SRV records available to UEs by way of the DNS servers, the service provider can provision in step 610 UEs with a select one of the FQDNs at a point of sale (POS), over-the-air, or by landline communications as previously mentioned. The service provider can provision the UEs with a corresponding logical FQDN according to the UE subscriber's LATA as well as other possible subdivisions such as the subscriber's assigned rate center. In this step, the OSS 102 can be notified of the provisioning of the UE (by the POS or otherwise) to maintain up-to-date records of the number of subscribers assigned to the FQDN as shown in FIG. 8.

To establish communication with the NGN network of FIG. 1, the UE can be programmed to query the DNS server in step 612 to retrieve the primary and secondary SRV records and their corresponding IP addresses as previously described in FIG. 4. Once the SRV records are retrieved, the UE can be programmed in step 616 to attempt registration with the primary S/BC according to its IP address. If the UE is able to successfully establish communications with the Access Office in step 618, the UE eventually registers with the NGN network in step 620 according to common registration processes used by Access and Server Offices.

Figure 5:
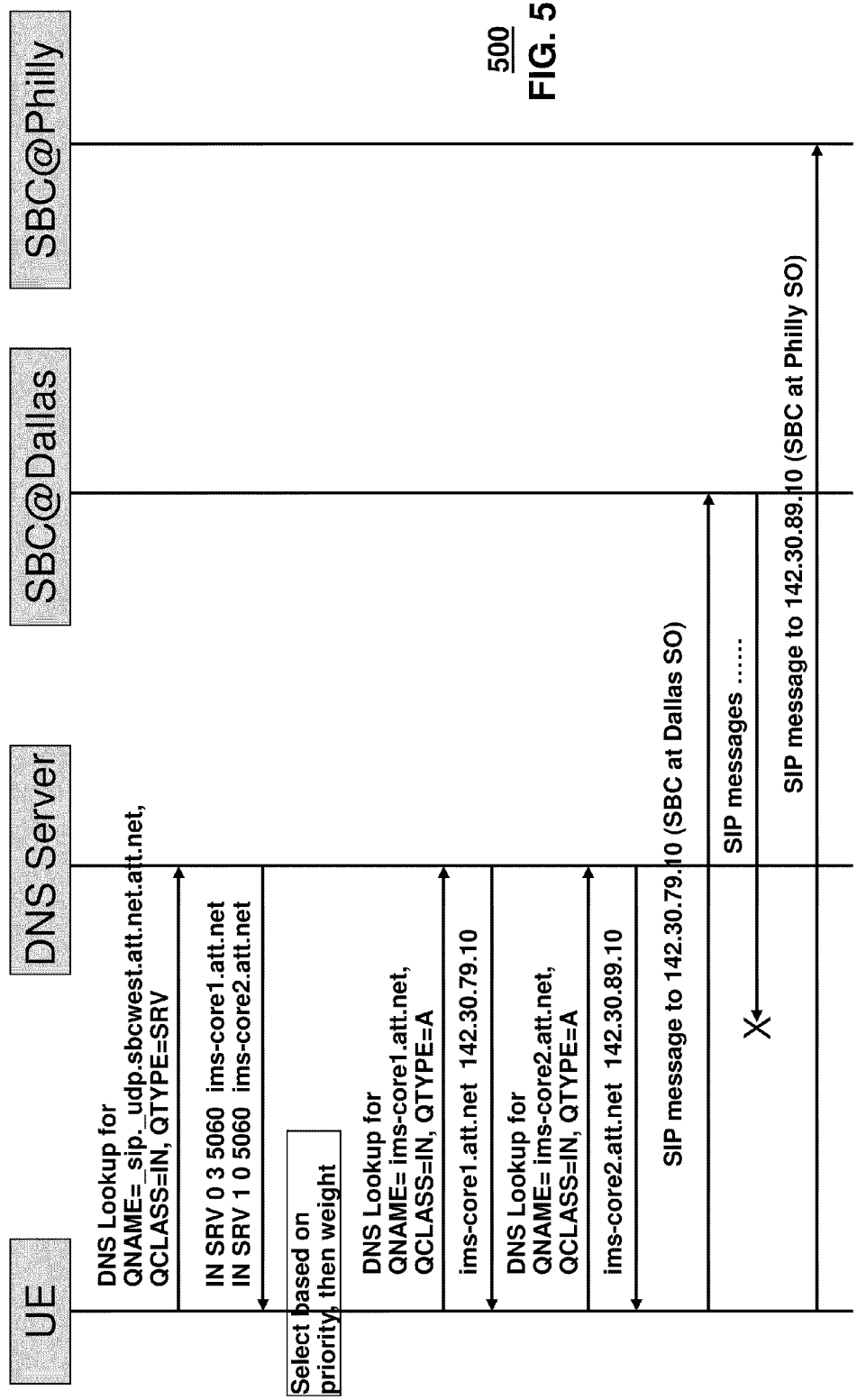

When the UE is unable to establish communication with the Access Office from which the primary S/BC operates due to a fault or interruption in any intermediate communication element between the Access and Server Offices, the UE can revert to step 622 where it attempts to register with the secondary S/BC which may operate in an Access Office different from the Access Office of the primary S/BC as previously illustrated in FIG. 5. Once the UE has registered with the NGN network in step 620 by way of either the primary or secondary S/BC, it can engage in communications with other UEs in the NGN network. In another embodiment (now shown), if the UE is unsuccessful in registering with the secondary S/BS in step 618, the UE may restart the cycle and attempt to register with the primary S/BC in step 616.

If the UE experiences a soft or hard reset (e.g., a power cycle or software reset) all provisioning information may be lost. After a reset in 621, the UE can be directed to step 612 where it resubmits a query to the DNS server according to its FQDN and restarts the registration process as previously described. If a reset condition has not occurred, the UE can proceed to step 623 where it determines if re-registration is required. Re-registration is a common process required by UEs in NGN networks. The UE can have a re-registration timer that triggers more frequently than a Time-to-Live (TTL) indicator that provides a refresh period for querying the DNS server. For instance, the NGN network may require UEs to re-register every 30 minutes with the S/BC, while requiring re-query with a DNS server every 2 hours.

With this in mind, if the UE re-registration timer has not expired, then it can return to step 620 where it remains registered to the S/BC as previously described. If, however, the re-registration timer has expired in step 623, the UE can proceed to step 624 to determine if the TTL timer has also expired thereby requiring a refresh of SRV records according to its FQDN, and a re-invocation of the registration process.

If the TTL timer has not expired, then the UE can proceed to step 616 where it will re-register with the primary S/BC (or the secondary S/BC if the UE is unsuccessful in registering with the primary S/BC) as previously described. If the TTL timer has expired in step 624 (independent of whether the re-registration timer has expired), the UE can be directed to step 612 where it queries the DNS server again according to its FQDN, thereby repeating the registration sequence previously described. If the primary or secondary SRV records of the FQDN have changed, then the UE will register with a different primary or secondary S/BC without necessarily changing the LATA-based FQDN of the UE.

The service provider may have reasons why it may want to rehome UEs to other Access Offices and/or S/BCs. For instance during maintenance or network upgrades, the service provider may decide to rehome UEs to another S/BC while maintenance or repairs are taking place. In another instance, a UE situated in Chicago may have been assigned to an S/BC of an Access Office in Philadelphia temporarily until such time that an Access Office in Chicago has been established. Temporary assignments or transitions between Access Offices can be accomplished by re-provisioning DNS servers with new SRV records for one or more LATA-based FQDNs without changing the LATA-based FQDNs of the UEs. Avoiding changes to the logical FQDN of many, and perhaps millions of, UEs can save a service provider significant costs in operations.

Figure 11:
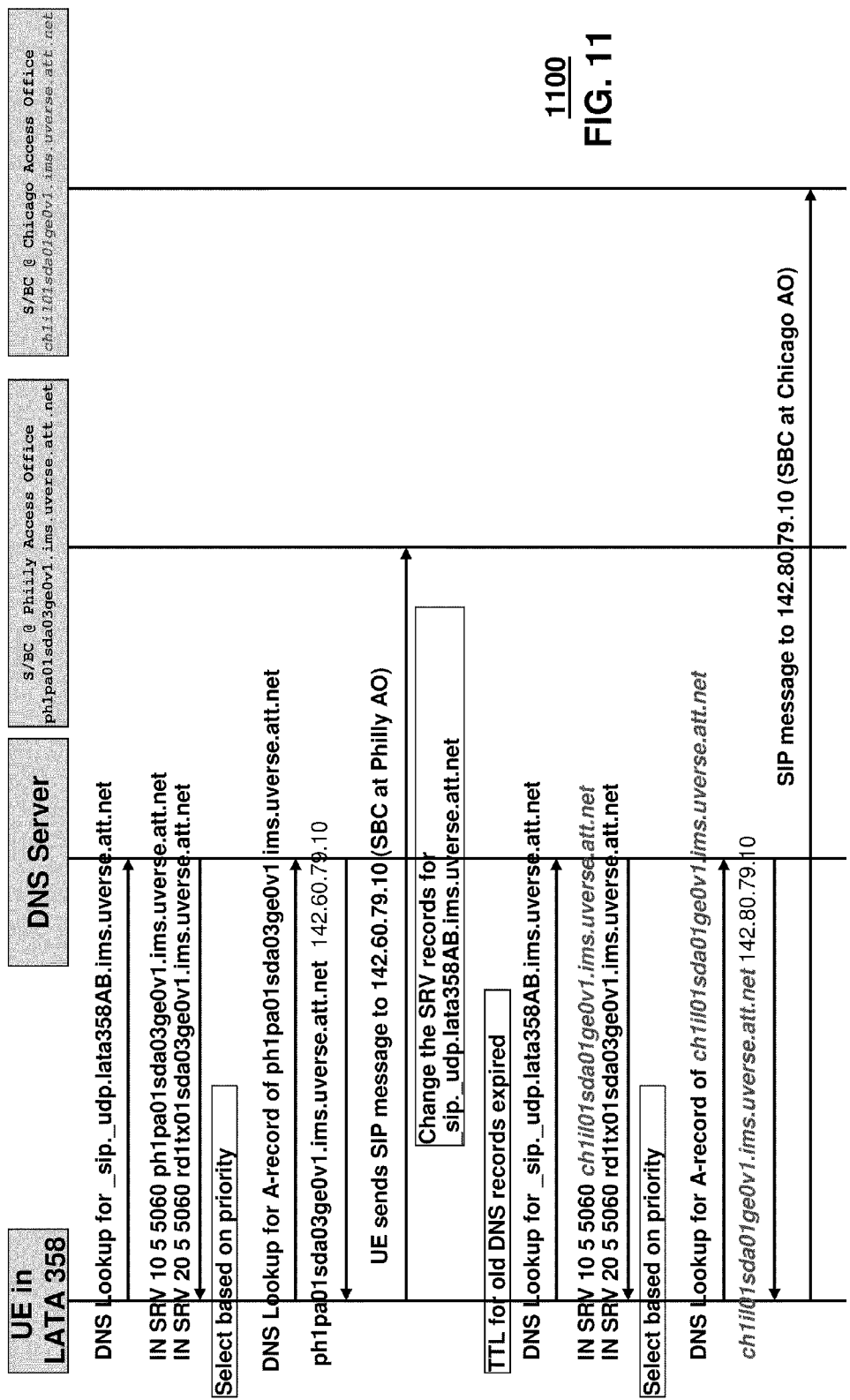

Thus, when a service provider determines in step 626 that a need exists to rehome UEs in one or more LATAs or rate centers, it can direct the OSS 102 to update the logical FQDN directories previously discussed with new primary and/or secondary SRV records for the one or more FQDNs associated with the UEs that the service provider has determined need to be rehomed to another S/BC and/or Access Office. Once these changes take place, the OSS 102 can further be programmed in step 608 to re-provision one or more DNS servers with the updated SRV records of the affected FQDNs. Once the TTL timer of the UEs with the affected logical FQDNs expires, said UEs will query the DNS server with its FQDN and thereby retrieve the updated SRV records which causes a rehoming registration process such as the illustrative example shown in FIG. 11.

Because the OSS 102 limits the capacity of UE devices per LATA-based FQDN as shown by the last column of FIG. 8, a change in one FQDN will cause a limited burst of re-registrations by the affected UEs. Accordingly, the LATA-based FQDNs configured with a maximum subscriber capacity provide an effective means to manage re-registrations during maintenance, repairs, or redistributions of UEs. In cases were multiple FQDNs have been updated with new SRV records, the DNS server can be further programmed to supply the UEs differing TTLs to stagger the rehoming process, thereby preventing cumulative re-registrations.

Based on the aforementioned embodiments of method 600, the OSS 102 can serve several functions. First, it can be programmed to manage LATA-based FQDNs and sub-divisions thereof (e.g., rate centers). It can further manage the assignment of S/BCs to the FQDNs by way of SRV records. It can also track the number of UEs assigned to each LATA-based FQDN and prevent excessive registrations with a maximum subscriber capacity limit. For network management tasks such as maintenance, repairs, and network expansions, the OSS 102 can be further programmed to update the SRV records of the FQDNs and the DNS servers supply provisioning information to the UEs. The OSS 102 can also be programmed with network engineering rules. For example, it can audit the aforementioned directories to ensure that no S/BC has to home more than a certain number of UEs during regular operations.

Figure 7:
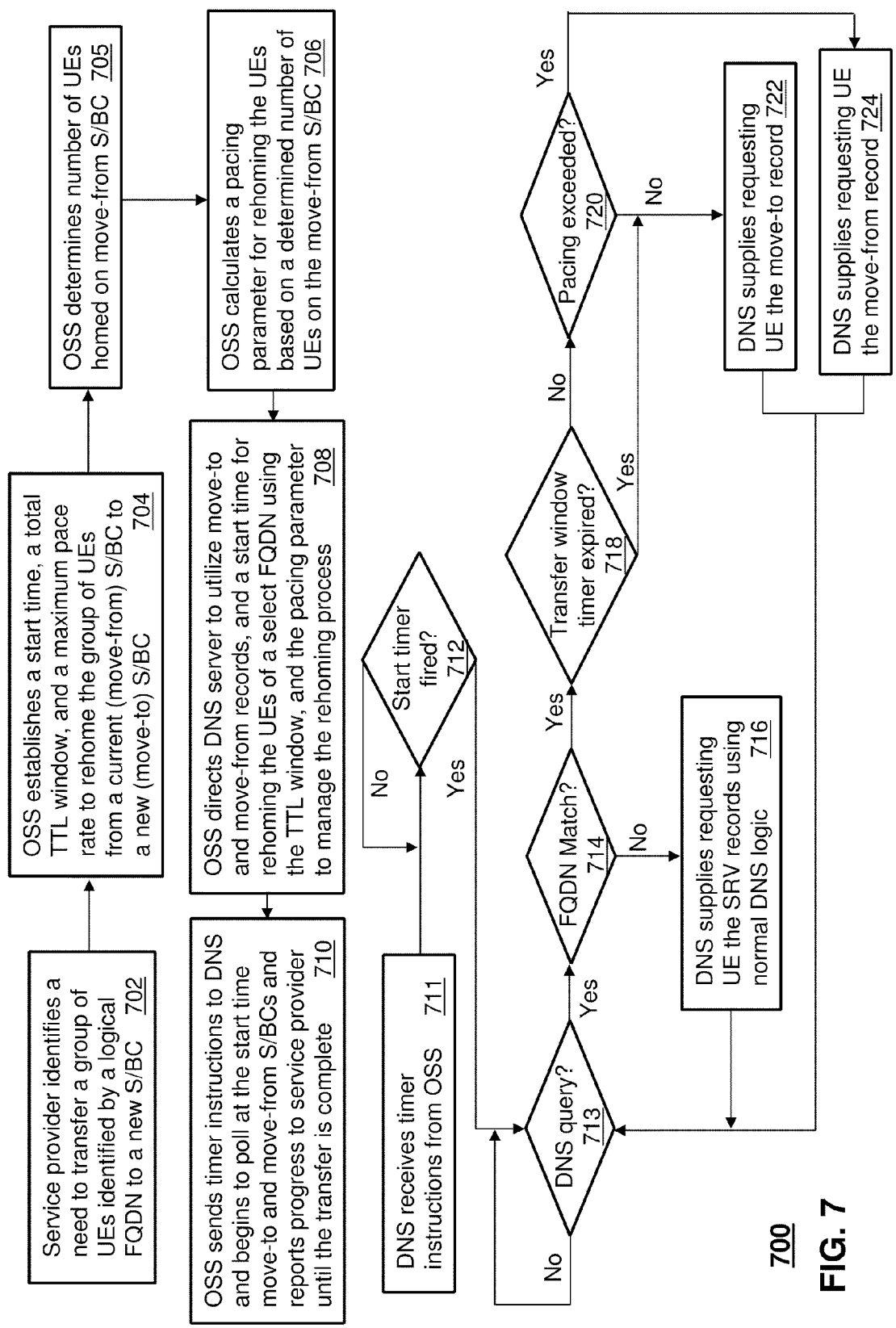

FIG. 7 depicts an illustrative embodiment of a method 700 operating in portions of the OSS 102 and the DNS servers of FIG. 1 for managing the rehoming of UEs in the NGN network. In particular, method 700 can provide a service provider a means to transfer UEs between S/BCs in a manner that prevents a flood of registrations which may adversely affect network performance. Method 700 can begin with step 702 in which a service provider identifies a need to transfer a group of UEs of a particular logical FQDN to a new S/BC. The need can arise from a regular maintenance schedule, an impromptu repair, network upgrades, or the need to transfer UEs to a new Access Office to accommodate a topology change in the NGN network. There may be other reasons to invoke step 702, which are contemplated by the present disclosure.

When a need to rehome UEs is identified, the service provider can direct the OSS 102 to establish a number of parameters for managing the transfer of UEs between S/BCs. For instance, the service provider can direct the OSS 102 in step 704 to establish a start time for the transfer of UEs between S/BCs. In same step, the service provider can direct the OSS 102 to use a TTL window for DNS records, and a transfer window with a maximum pace rate to rehome the UEs of the identified FQDN from a current S/BC to a new S/BC. The service provider identifies the current S/BC with a move-from SRV record, while the new S/BC is identified with a move-to SRV record. An illustration of these settings of the OSS 102 is shown in FIG. 12.

In this illustration, the service provider directs the OSS 102 to use a start time of 6:00 GMT on Oct. 1, 2009, for UEs having the FQDN _sip._udp.lata358AA.ims.uverse.att.net. The primary SRV record of the move-from S/BC ch1il01sda01ge0v1.ims.uverse.att.net in this example is to be replaced with the primary SRV record of the move-to S/BC ch1il01sda11ge0v1.ims.uverse.att.net. The secondary SRV records remain unchanged (that is, they continue to use the secondary S/BC rd1tx01sda01ge0v1.ims.uverse.att.net). The OSS 102 is programmed with a TTL window of 7200 seconds (or 2 hours) for DNS records, a transfer window timer of 7200 seconds (or 2 hours), and a maximal allowable pace of registrations to the move-to S/BC of 100 UEs per second. The transfer window timer can indicate to the DNS server a desired time for transferring the UEs from the move-from S/BC to the move-to S/BC. It should be noted that the transfer window could be less or more than the TTL window and the total time required for all UEs to successfully move from the move-from S/BC to move-to S/BC may be up to the transfer window plus the TTL window the DNS servers set for UEs. Utilizing 7200 seconds for the transfer window has been selected as a matter of illustration. Other settings could have been used. For example, the transfer window could have been set to 10,800 seconds (3 hours) to provide a longer period of time for the transfer of UEs.

In preparation to determine a pacing parameter, the OSS 102 first determines in step 705 the number of UEs homed on the move-from S/BC. In step 706, the OSS 102 can use the given transfer window and maximum pace to determine the pacing parameter for the rehoming process according to the number of UEs currently homed on the move-from S/BC as determined in step 705. Suppose for example that the OSS 102 determines that 172,000 UEs are currently homed on the move-from S/BC. The OSS 102 can calculate a pace for the rehoming process based on the minimum of the maximum pace (100 UEs per second) or a formula such as three times the total number of UEs homed on the move-from S/BC divided by the transfer window. Such a calculation can be expressed by the following formula:

$$\min(100, 3*\text{total\_UEs\_homed}/\text{Transfer\_Window})$$

Using the illustration of FIG. 12, the above formula would provide a pacing parameter of 72 UEs per second [min(100, 3*172,000/7200]. It should be noted that this is an illustrative formulation. Other suitable formulas can be used to determine a pace rate of the UEs to be rehomed. The pacing parameter can be used to prevent an excess rate of UE registrations. This concept can be illustrated by a DNS server of FIG. 1 having enhanced operations such as those described in steps of 710-724 of FIG. 7, and a description followings below.

Once the pace rate is determined in step 706, the OSS 102 can be directed to a DNS server of FIG. 1 to utilize move-to and move-from records, and a start time for rehoming the UEs of a select FQDN using the TTL window for DNS records, the transfer window for applying steps 713-724 (described below) during the transfer process, and the pacing parameter of FIG. 12 to manage the rehoming process. In step 710, the OSS 102 instructs the DNS server to start a start timer at the start time (e.g., 2 hour timer started at 6:00 GMT, on Oct. 1, 2009). At the same time, the OSS 102 can be directed to periodically poll the move-to and move-from S/BCs to report the number of subscribers in each S/BC to allow operation staff of the service provider to monitor the progress of the rehome operation. The OSS 102 can perform the task in step 710 independent of DNS server operations until the transfer is complete. Polling can last for the duration of the transfer window plus the TTL window the DNS servers use for UEs.

In step 711, the DNS receives timer instructions from the OSS 102. Once the DNS detects that the start timer has fired in step 712, the method proceeds to step 713, the transfer process can begin with the transfer window timer started using a duration defined by the timer instructions received from the OSS 102. When a query is detected by the DNS server in step 713, the DNS server can determine in step 714 if the query is requesting for a DNS resolution of a logical FQDN that contains a to-be replaced SRV record. If there is no match, the DNS server can supply the requesting UE in step 716 SRV records (very likely previously used SRV records) using normal DNS processing logic. The UE can then home to the primary S/BC (or secondary S/BC if there's a communication interruption) according to the process previously described in FIG. 6 starting from step 616.

If the logical FQDN supplied by the requesting UE, however, matches the logical FQDN involved in rehoming UEs of the move-from S/BC, the DNS server can instead proceed from step 714 to step 718 where it determines if the transfer window timer has expired. If transfer window timer has expired, the DNS server proceeds to step 722 where it supplies the requesting UE the new DNS resolution with new SRV records (that contains the move-to SRV record). With the updated primary SRV record, the UE rehomes to the move-to S/BC according to the process described in FIG. 6 starting from step 616, thereby effectuating the transfer of the requesting UE to the new S/BC. Once the transfer window timer has expired, all UEs requesting resolution of the affected logical FQDN are supplied the new SRV records that contain the move-to S/BC's SRV record thereby causing a transfer of the remaining UEs to the move-to S/BC.

If the transfer window timer has not expired in step 718, the DNS server can proceed to step 720 where it determines if the rate of queries from the UEs affected by the transfer exceeds the pacing parameter of step 706. The DNS server can utilize a sliding window defined by the pacing parameter to make this determination. If for example the rate of queries of the UEs has exceeded 72 queries per second by the time the present UE is requesting DNS resolution for the logical FQDN, then the DNS server proceeds from step 720 to step 724 where it provides the UE with a DNS resolution that contains the old SRV records (including the move-from S/BC's SRV record). Accordingly, the requesting UE re-registers with the same primary (or secondary S/BC).

If the transfer window timer has not expired, and the pacing parameter has not been exceeded, the DNS server proceeds from step 720 to step 722 where it supplies the requesting UE with the resolution that contains the newer SRV records (including the move-to S/BC's SRV record). With the updated primary SRV record, the UE rehomes to the move-to S/BC according to the process described in FIG. 6 starting from step 616, thereby effectuating the transfer of the requesting UE to the new S/BC. The combination of steps 720, 722, and 724 prevents an excess of new registrations to the move-to S/BC which may adversely affect the performance of the NGN network when a large group of UEs is to be transferred to a new S/BC.

When the transfer of UEs to a move-to S/BC is temporary (e.g., maintenance, repairs, network upgrades, etc.), method 700 can be reapplied to reinstate the UEs to the move-from S/BC. Additionally, method 700 can be adapted so that when groups of UEs of differing FQDNs are to be transferred, the start times of each affected FQDN can be staggered to distribute the transfer over the course of a single day, days, weeks, etc. Other adaptations can be applied to method 700 which are contemplated by the present disclosure. In order to reduce overhead in DNS server processing, the OSS 102 (which can be represented operationally as a Rehome Operation Controller) can instruct the DNS servers to disable the logic depicted by steps 711 through 724 in order to function as a normal DNS server when rehoming operations are no longer needed.

From the foregoing descriptions, it would be evident to an artisan with ordinary skill in the art that the aforementioned embodiments can be modified, reduced, or enhanced without departing from the scope and spirit of the claims described below. Accordingly, the reader is directed to the claims for a fuller understanding of the breadth and scope of the present disclosure.

Figure 13:
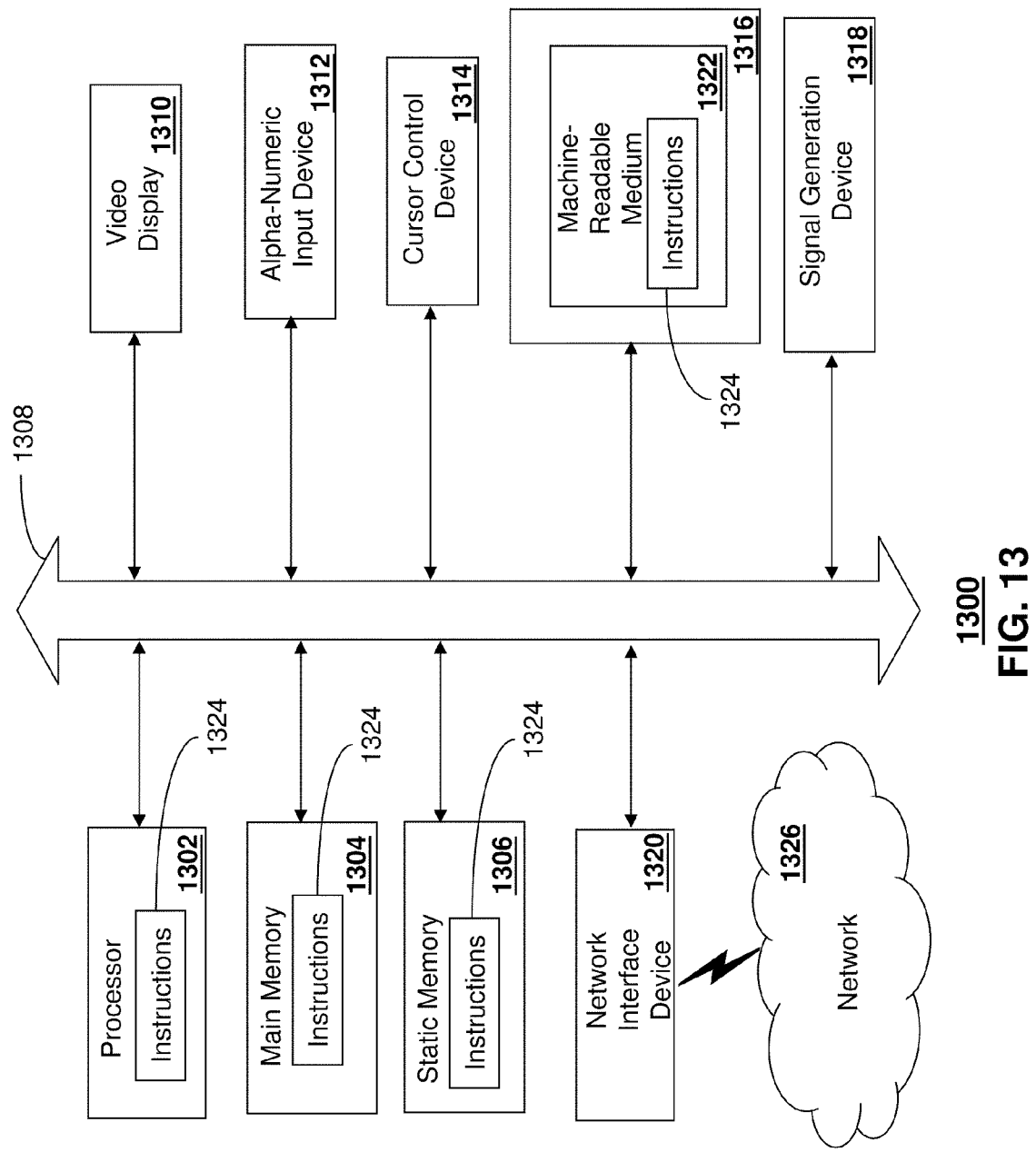
FIG. 13 depicts an illustrative diagrammatic representation of a machine in the form of a computer system within which a set of instructions, when executed, may cause the machine to perform any one or more of the methodologies disclosed herein.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A domain name system server, comprising:
a memory to store computer instructions; and
a controller circuit coupled to the memory, wherein the computer instructions, responsive to being executed by the controller circuit, cause the controller circuit to perform operations comprising:
receiving new provisioning information for updating a fully qualified domain name; and updating the fully qualified domain name with the new provisioning information, wherein the new provisioning information, comprises a start time for rehoming one or more user endpoint devices assigned to a current session border controller, a move-from record comprising a descriptor of at least the current session border controller, a move-to record comprising a descriptor of at least a new session border controller to which to rehome the one or more user endpoint devices, a transfer window representing a time for the rehoming of the one or more user endpoint devices to the new session border controller, and a pacing parameter for rehoming the one or more user endpoint devices to the new session border controller during the transfer window.

2. The domain name system server of claim 1, wherein the controller circuit when executing computer instructions, performs operations comprising;
initiating a transfer window timer having a duration defined by the transfer window responsive to detecting the start time;
receiving a request for provisioning information from an user endpoint device; and determining whether the fully qualified domain name of the requesting user endpoint matches the updated fully qualified domain name.

3. The domain name system server of claim 2, wherein the controller circuit when executing computer instructions, performs operations comprising transmitting to the requesting user endpoint provisioning information previously used by the user endpoint device responsive to detecting a mismatch between the fully qualified domain name of the requesting user endpoint device and the updated fully qualified domain name.

4. The domain name system server of claim 2, wherein the controller circuit when executing computer instructions, performs operations comprising determining whether the request for the provisioning information is received within the transfer window responsive to detecting a match between the fully qualified domain name of the requesting user endpoint device and the updated fully qualified domain name.

5. The domain name system server of claim 4, wherein the controller circuit when executing computer instructions, performs operations comprising transmitting to the requesting user endpoint device the move-to record responsive to detecting that the request has been received after expiration of the transfer window.

6. The domain name system server of claim 4, wherein the controller circuit when executing computer instructions, performs operations comprising transmitting to the requesting user endpoint device the move-to record responsive to detecting that the request has been received during the transfer window, and a number of provisioning queries received from one or more other user endpoint devices has not exceeded the pacing parameter.

7. The domain name system server of claim 4, wherein the controller circuit when executing computer instructions, performs operations comprising transmitting to the requesting user endpoint device the move-from record responsive to detecting that the request has been received during the transfer window, and a number of provisioning queries received from one or more other user endpoint devices has exceeded the pacing parameter.

8. The domain name system server of claim 1, wherein the move-from and move-to records correspond to server records conforming to a standard promulgated by the Internet Engineering Task Force.

9. The domain name system server of claim 2, wherein the controller circuit when executing computer instructions, performs operations comprising:
storing the move-to record as a permanent record of the updated fully qualified domain name; and
storing the move-from record as a temporary record of the updated fully qualified domain name until the transfer window timer expires.

10. The domain name system server of claim 1, wherein the pacing parameter comprises one of a predetermined maximum rate of user endpoint devices registering with the new session border controller, and a calculated rate of user endpoint devices registering with the new session border controller.

11. A computing device, comprising:
a memory to store computer instructions; and
a controller circuit coupled to the memory, wherein the computer instructions, responsive to being executed by the controller circuit, cause the controller circuit to perform operations comprising:
receiving new provisioning information to rehome one or more user endpoint devices;
directing a domain name system server to update a fully qualified domain name associated with the one or more user endpoint device to be rehomed with the new provisioning information, wherein the new provisioning information, comprises a start time for rehoming the one or more user endpoint devices from a current session border controller to a new session border controller, and a pacing parameter for rehoming the one or more user endpoint devices to the new session border controller.

12. The computing device of claim 11, wherein the controller circuit when executing the computer instructions, performs operations comprising:
determining a number of user endpoint devices homed to the current session border controller; and
calculating the pacing parameter according to the determined number of user endpoint devices.

13. The computing device of claim 11, wherein the new provisioning information further comprises a move-to record comprising a descriptor of at least the new session border controller, and wherein the move-to record conforms to a standard promulgated by the Internet Engineering Task Force.

14. The computing device of claim 13, wherein the controller circuit when executing the computer instructions, performs operations comprising monitoring the transfer of user endpoint devices between the current session border controller to the new session border controller and presenting a status of the transfer.

15. The computing device of claim 11, wherein the new provisioning information further comprises a transfer window representing a total time for rehoming the one or more user endpoint devices to the new session border controller.

16. A method, comprising:
receiving, by a domain name system, new provisioning information for updating a fully qualified domain name; and
updating, by the domain name system, the fully qualified domain name with the new provisioning information, wherein the new provisioning information, comprises a start time for rehoming one or more user endpoint devices from a current session border controller to a new session border controller, and a parameter to pace registrations of the one or more user endpoint devices to the new session border controller.

17. The method of claim 16, wherein the provisioning information comprises at least one of a move-from record comprising a descriptor of at least the current session border controller, a move-to record comprising a descriptor of at least the new session border controller, and a transfer window representing a total time for the rehoming the one or more user endpoint devices to the new session border controller.

18. The method of claim 17, comprising:
initiating, by the domain name system, a transfer window timer defined by the transfer window responsive to detecting the start time;
receiving, by the domain name system, a request for provisioning information from a user endpoint device; and
determining, by the domain name system, whether the fully qualified domain name of the requesting user endpoint device matches the updated fully qualified domain name.

19. The method of claim 18, comprising transmitting, by the domain name system, to the requesting user endpoint device provisioning information previously used by the user endpoint device responsive to detecting a mismatch between the fully qualified domain name of the requesting user endpoint device and the updated fully qualified domain name.

20. The method of claim 18, comprising:
transmitting, by the domain name system, to the requesting user endpoint device the move-to record responsive to detecting that the request has been received after expiration of the transfer window;
transmitting, by the domain name system, to the requesting user endpoint device the move-to record responsive to detecting that the request has been received during the transfer window, and a number of provisioning queries received from one or more other user endpoint devices has not exceeded the pacing parameter; and
transmitting to the requesting user endpoint device the move-from record responsive to detecting that the request has been received during the transfer window, and the number of provisioning queries received from the one or more other user endpoint devices has exceeded the pacing parameter.

* * * * *